United States Patent [19]

Loree

[11] 4,347,998
[45] Sep. 7, 1982

[54] MULTIPLE WIRE BUNDLE SUPPORT ASSEMBLY

[75] Inventor: Thomas J. Loree, Renton, Wash.

[73] Assignee: The Boeing Company, Seattle, Wash.

[21] Appl. No.: 254,798

[22] Filed: Apr. 15, 1981

[51] Int. Cl.³ .......................... F16L 3/22; H02G 3/02
[52] U.S. Cl. .................................. 248/68 R; 138/115;
138/157; 174/97; 174/101
[58] Field of Search .............. 174/40 CC, 68 C, 70 C,
174/72 A, 72 C, 95, 97, 101, 135, 156; 138/108,
115–117, 157, 163; 211/60 R, 60 G, 60 T, 64,
68, 69; 248/68 R, 74 R

[56] References Cited

U.S. PATENT DOCUMENTS

| 294,563 | 3/1884 | Beach .................................. 174/156 |
| 3,175,262 | 3/1965 | Wilson ........................ 174/40 CC X |
| 3,346,688 | 10/1967 | Fields ................................. 174/97 X |

FOREIGN PATENT DOCUMENTS

| 248752 | 1/1964 | Australia ............................. 138/108 |
| 1060953 | 7/1959 | Fed. Rep. of Germany ........ 174/97 |
| 2103952 | 8/1972 | Fed. Rep. of Germany .... 174/68 C |
| 854137 | 1/1940 | France ................................. 174/101 |
| 1305181 | 8/1962 | France ................................. 174/97 |
| 1078193 | 8/1967 | United Kingdom ............. 174/72 A |

Primary Examiner—Laramie E. Askin
Attorney, Agent, or Firm—Conrad O. Gardner; B. A. Donahue

[57] ABSTRACT

An electrical wire bundle support assembly for maintaining separation between the individual wire bundles. The multiple wire bundle support assembly comprises a molded base member adapted for mounting to aircraft structure which contains a plurality of channels for supporting individual wire bundles. A molded spring action cover member is utilized in the wire bundle support assembly; the spring action cover member includes a plurality of foam cushion portions which extend therefrom in an indexed manner into corresponding channels in the base support member thereby resiliently restraining the plurality of wire bundles seated in the respective channels.

2 Claims, 5 Drawing Figures

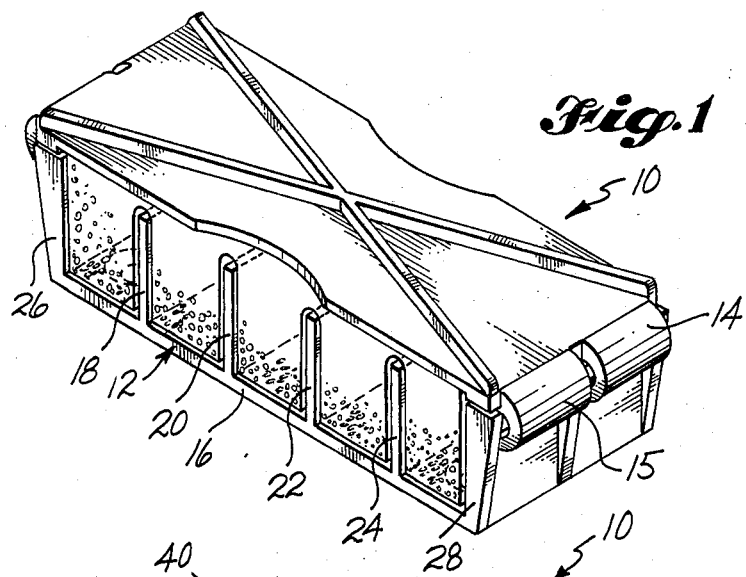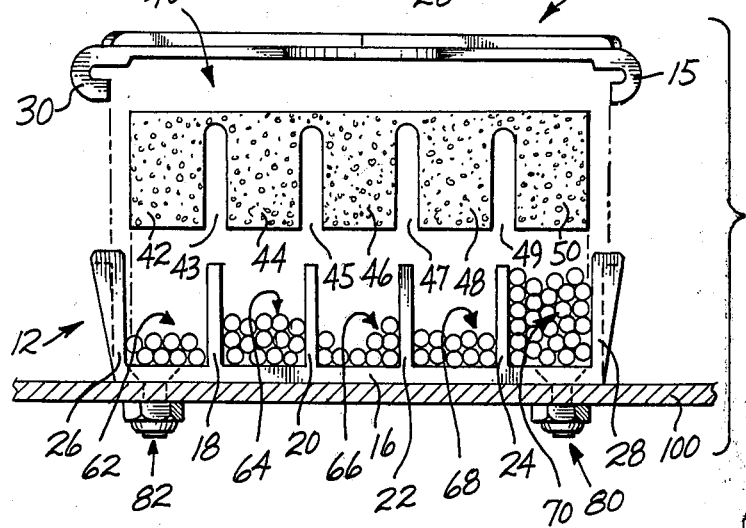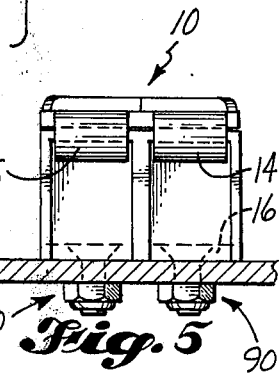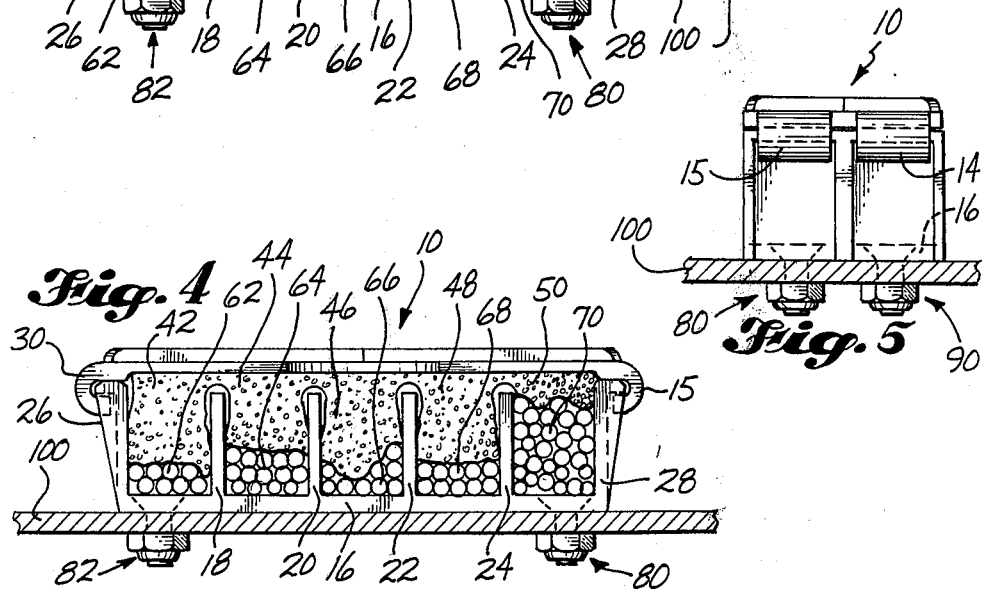

MULTIPLE WIRE BUNDLE SUPPORT ASSEMBLY

The present invention relates to electrical wire bundle support devices and more particularly to a multiple wire bundle support assembly for maintaining a predetermined separation between individual wire bundles.

Heretofore in the patent literature, French Patent No. 1,305,181 is illustrative of a molded base containing channels for supporting wires or wire bundles, however not incorporating resilient foam cushioning means. The utilization of a cover associated resilient material cushioning wires supported by a base is well known as shown in French Patent No. 854,137 and German OLS (Offenlegungsschrift) Publication 2,103,952 dated (Offenlegungstag) Aug. 17, 1972; however, several resilient pads in contrast to a unitary base channel mated pair are utilized in the references. FIG. 4 of U.S. Pat. No. 294,563 is further illustrative of a method of separating, insulating, confining, and supporting several individual wires, however without the utilization of resilient foam material structure.

It is accordingly an object of the present invention to provide means including a molded base for mounting to aircraft structure for containing several distinct channel supporting means for a plurality of individual wire bundles.

It is a further object of this invention to provide a molded spring action cover having foam cushioning means for individually matching a plurality of receiving channels in the base which contain individual wire bundles thereby resiliently restraining the wire bundles in the individual channels of the base.

In accordance with a preferred embodiment of the present invention, a multiple wire bundle support assembly includes a molded base for mounting to aircraft structure, the base containing several distinct channels for physically separating individual wire bundles from each other; and, the multiple wire bundle support assembly further including a molded spring action cover having individual foam cushions which match the individual channels in the base which individual foam cushions are utilized to resiliently restrain the individual wire bundles in the plural channeled base structure.

A full understanding of the invention, and of its further objects and advantages and the several unique aspects thereof, will be had from the following description when taken in conjunction with the accompanying drawings in which:

FIG. 1 is a view taken in perspective of the present multiple wire bundle support assembly showing individual wire bundles disposed into individual base channels with the cover of the assembly shown in locked position;

FIG. 3 is an end view of the multiple wire bundle support assembly of FIG. 1 looking down the channels lengthwise in the base assembly, which base assembly is shown fastened to aircraft structure;

FIG. 4 is a side view of the multiple wire bundle support assembly of FIG. 3 however showing the spring action cover with foam cushioning in spring action position resiliently restraining the wire bundles in the base channels; and, FIG. 5 is an end view of the multiple wire bundle support assembly of FIG. 4 showing details of the spring action function of the cover portion of the assembly.

Figure 2:
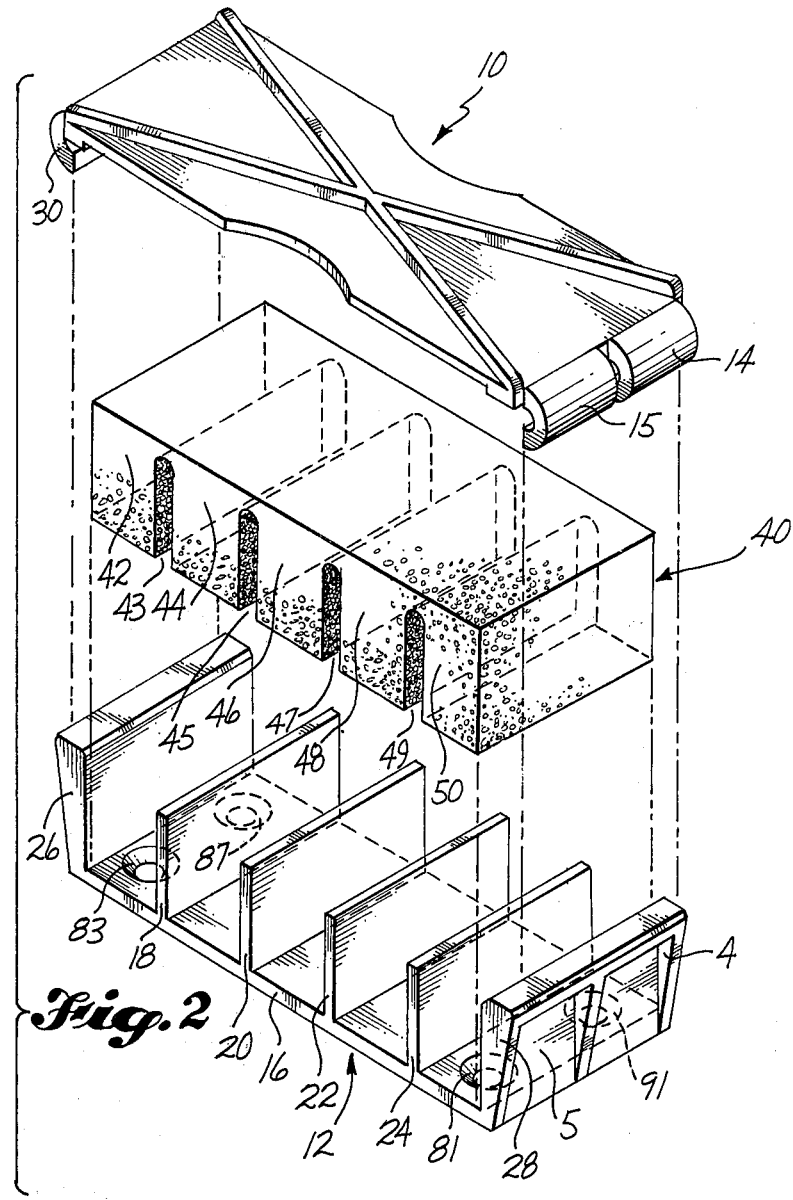
FIG. 2 shows an exploded perspective view of the multiple wire bundle support assembly of FIG. 1.

Turning now to FIG. 1, the present multiple wire bundle support assembly can be seen to comprise a relatively flat shaped cover member 10 which includes a plurality of spring action end portions, a pair of which, 14 and 15, are shown on one end with the other spring action end portions on the other end remaining hidden from view in the perspective of FIG. 1. Plural channeled base member 12 is seen to include a plurality of channels formed between the upturned end portions 26 and 28 of intermediate bottom portion 16. Channel wall members 18, 20, 22, and 24 extending parallel with end wall members 26 and 28 along the length of base portion 16 of plural channeled base member 12 are seen to provide a housing for wire bundles 62, 64, 66, 68, and 70 (see FIG. 3).

Turning now to the exploded view in FIG. 2 of the present multiple wire bundle support assembly, it can be seen that base portion 16 of plural channeled base member 12 includes a pair of holes 83 and 87 in the bottom of the channel formed between end wall portion 26 and side wall portion 18. Also, at the other end of plural channel base member 12 and in the bottom portion 16 thereof between end wall portion 28 and side wall portion 24 are located a further pair of mounting holes 81 and 91. Returning now to FIG. 1, it will be noticed that in each of the respective channels formed between the end wall and side wall portions there is contained the individual wire members respectively 62, 64, 66, 68, and 70. While only five channels are actually shown in base member 12, base member 12 may include a further or lesser number of channels depending upon the number of wire bundles required to be strapped down to the aircraft supporting structure. From FIG. 2 it can be seen that a multi-element integral resilient foam member 40 (with slots 43, 45, 47 and 49 to clear channel wall members 18, 20, 22 and 24, and having individual foam cushions 42, 44, 46, 48 and 50) is included between cover member 10 and multichanneled base member 12 to confine and support the individual wire bundles (as seen more clearly in FIG. 3) 62, 64, 66, 68, and 70 within the individual channels in plural channeled base member 12.

Multichanneled base member 12 can be seen fastened down to airplane structure 100 in FIGS. 3, 4 and 5. In the side view looking down the channels of FIG. 3 the fasteners 82 and 80 can be seen to perform the fastening function while in the end view of FIG. 5 the fastener 90 can also be seen with the fastener 80 retaining the bottom portion 16 of plural channeled member 12 to aircraft structure 100 upon which it is desired to support the plurality of wire bundles. In FIG. 2 it can be seen as previously described how each pair of holes, e.g., 83 and 87 and also 81 and 91, are located at opposite ends of multichannel base member 12 to secure through fastening means the present multiple wire bundle support assembly to the aircraft structure 100.

From FIG. 2 it can be seen how inturned end lip portions 14 and 15 of cover member 10 are utilized to provide the spring action function to multichannel base member 12, viz., by seating in recessed portions 4 and 5 of end wall member 28. Similar structure is provided in further end wall member 26 in the form of a pair of recesses to provide spring action seating of inturned lip 30 and a further lip portion at the same end not shown because of the perspective view taken in FIG. 2. The predetermined and desired spacing is maintained between individual wire bundles 62 and 64 as shown in FIG. 3 by selecting a predetermined thickness for intermediate wall member 18.

The present multiple wire bundle support assembly has been shown to include a multichannel base member for receiving a plurality of wire bundles which base member 12 may be premounted on the portion of aircraft structure 100, an advantage where space is limited and positive separation is required. Resilient foam cushion member 40 inserted between cover member 10 and multichannel base member 12 for retaining the plurality of wire bundles may comprise a polyurethane foam material, while multichannel base member 12 and cover member 10 may be molded from a nylon material, e.g., nylon ZYTEL 103 available from the duPont Company. The present three-part multiple wire bundle support assembly for supporting a plurality of wire bundles consisted of a base member 12 which was approximately 3.6 inches long by 1.35 inches wide by 0.90 inches deep for receiving and retaining five wire bundles. The dimensions required would be increased or decreased depending upon the increase or decrease in number of wire bundles desired to be mounted to the aircraft structure 100.

What is claimed is:

1. An assembly for mounting a plurality of wire bundles on a structure comprising in combination:

a cover member including a pair of inturned lip portions at respective ends of said cover member;

a multichanneled base member for receiving a corresponding plurality of wire bundles in respective channels of said base member;

a resilient insert comprising a plurality of foam cushions adapted for insertion respectively in said plurality of channels to retain said wire bundles; and, said multichanneled base member having first and second end wall portions, each of said end wall portions having a pair of recesses adapted to receive corresponding pairs of said inturned lip portions.

2. The invention according to claim 1 wherein the bottoms of a first and further channel of said multichannel base member include a pair of mounting holes for securing said multichannel base member to an adjacent structure.

* * * * *